United States Patent [19]
Szwast et al.

[11] Patent Number: 5,918,201
[45] Date of Patent: Jun. 29, 1999

[54] SYSTEM AND METHOD FOR MONITORING TOOL CYCLES

[75] Inventors: Richard T. Szwast, Waterford; Lawrence F. Rapp, Bloomfield Hills; Edwin C. Scholl, Pontiac; Michael Ritchey, Fenton; Lloyd H. Wipperman, Rochester Hills, all of Mich.

[73] Assignee: GPX Corporation

[21] Appl. No.: 08/740,227

[22] Filed: Oct. 25, 1996

[51] Int. Cl.⁶ ..................................................... B25B 23/00
[52] U.S. Cl. ............................ 702/182; 702/189; 73/1.09; 73/862.23
[58] Field of Search ................................ 364/551.02, 510, 364/528.1, 528.39; 318/432, 434; 73/862.23, 862.21, 761, 1.09, 1.12; 81/467; 702/117, 182, 189

[56] References Cited

U.S. PATENT DOCUMENTS

| | | | |
|---|---|---|---|
| 3,898,875 | 8/1975 | Knoop et al. | 73/116 |
| 3,920,082 | 11/1975 | Dudek | 173/12 |
| 3,926,264 | 12/1975 | Bardwell et al. | 173/182 |
| 4,043,222 | 8/1977 | Dudek | 74/606 R |
| 4,066,942 | 1/1978 | Bardwell et al. | 318/434 |
| 4,081,037 | 3/1978 | Jonsson | 173/1 |
| 4,244,213 | 1/1981 | Marcinkiewicz | 73/139 |
| 4,281,538 | 8/1981 | Dudek | 73/862.21 |
| 4,294,110 | 10/1981 | Whitehouse | 73/862.23 |
| 4,316,512 | 2/1982 | Kibblewhite et al. | 173/183 |
| 4,361,945 | 12/1982 | Eshghy | 73/761 |
| 4,522,075 | 6/1985 | Pohl | 73/862.23 |
| 4,544,039 | 10/1985 | Crane | 173/12 |
| 4,571,696 | 2/1986 | Bitzer | 364/552 |
| 4,620,449 | 11/1986 | Borries et al. | 73/862.21 |
| 4,669,319 | 6/1987 | Heyraud | 73/962.23 |
| 4,715,211 | 12/1987 | Lehoczky | 73/1 C |
| 4,759,225 | 7/1988 | Reynertson et al. | 73/862.21 |
| 4,864,903 | 9/1989 | Bickford et al. | 81/467 |
| 4,959,797 | 9/1990 | McIntosh | 364/508 |
| 5,131,130 | 7/1992 | Eshghy | 29/407 |
| 5,172,774 | 12/1992 | Melrose | 173/182 |
| 5,187,959 | 2/1993 | Davi | 72/9 |
| 5,212,862 | 5/1993 | Eshghy | 29/407.03 |
| 5,231,374 | 7/1993 | Larsen et al. | 340/540 |
| 5,284,217 | 2/1994 | Eshghy | 173/176 |
| 5,440,935 | 8/1995 | Petersen | 73/765 |
| 5,542,303 | 8/1996 | Neuffer | 73/862.23 |
| 5,689,434 | 11/1997 | Tambini et al | 364/510 |

FOREIGN PATENT DOCUMENTS

| | | |
|---|---|---|
| 0586811A1 | 3/1994 | European Pat. Off. . |
| 4118595A1 | 12/1992 | Germany . |
| 29615123U1 | 1/1998 | Germany . |
| WO 93/06969 | 4/1993 | WIPO . |

*Primary Examiner*—Kamini Shah
*Assistant Examiner*—Bryan Bui
*Attorney, Agent, or Firm*—Burns, Doane, Swecker & Mathis, L.L.P.

[57] ABSTRACT

A method for processing torque transducer data is provided. The method includes sampling a signal received from a torque transducer (14). The cycle count stored on a data memory device (112) at the torque transducer (14) is then incremented if the sampled signal indicates that a torque cycle has occurred.

34 Claims, 5 Drawing Sheets

SYSTEM AND METHOD FOR MONITORING TOOL CYCLES

RELATED APPLICATIONS

This application is related to co-pending application "SYSTEM AND APPARATUS FOR A TORQUE TRANSDUCER WITH DATA PROCESSING CAPABILITIES," Ser. No. 08/740,226, commonly owned and assigned with the present application.

TECHNICAL FIELD OF THE INVENTION

This invention relates in general to torque transducers, and more particularly to a system and method for monitoring tool cycles.

BACKGROUND OF THE INVENTION

Torque transducers are well known in the art. Torque transducers are typically used with power tools that drive threaded fasteners. These power tools may be powered by pneumatic drivers, electric drivers, or other suitable drivers.

In operation, a torque transducer will be placed on a threaded fastener driver such that the torque applied to the drive shaft of the threaded fastener driver may be measured. Because threaded fasteners may be damaged by the application of excessive torque, the output from the torque transducer may be used to limit the maximum torque applied to the device. For example, the output from the torque transducer may be fed into the power control for the threaded fastener driver. The power control may then be set to shut off power to the threaded fastener driver if the output of the torque transducer exceeds a certain level.

To ensure that the output of the torque transducer measures the actual torque being applied by the threaded fastener driver, the torque transducer must be calibrated periodically through a process called "dead weight testing." Calibration testing assures that the torque transducer accurately measures the actual torque being applied by the threaded fastener driver. Nevertheless, tool management problems are associated with tool repair and torque transducer calibration. In order for calibration to be effective, the date and calibration period for each tool must be tracked.

Although tracking may be centralized to increase efficiency, tool use is typically distributed. Tools must therefore be transported from their location in a manufacturing facility to a special calibration shop. Personnel must find tools that need to be calibrated or repaired, transfer the tools to the shop, repair the tools or perform calibration procedures, record the results, and return the tools to the appropriate field location. Tools may be misplaced during this process, for example by returning the tool to the wrong location, and errors or oversight may result in improper calibration or other problems.

SUMMARY OF THE INVENTION

Therefore, a need has arisen for a system and apparatus for a torque transducer with data processing capabilities.

In accordance with the teachings of the present invention, a system and apparatus for a torque transducer with data processing capabilities is provided that allows tool data and calibration data to be stored with each tool, on data processing and data memory devices contained within the torque transducer housing.

One aspect of the present invention provides a method for processing torque transducer data. The method includes sampling a signal received from a torque transducer. The cycle count stored on a data memory device of a circuit is then incremented if the sampled signal indicates that a torque cycle has occurred.

The present invention provides many important technical advantages. One important technical advantage of the present invention is a method that allows data processing to occur at the torque transducer. Thus, cycle torque cycles may be counted and stored locally at each tool.

Another important technical advantage of the present invention is that tool data such as full scale torque and target calibration torque can be automatically sent from the tool to the tool controller and stored on a data memory of the tool controller.

BRIEF DESCRIPTION OF THE DRAWINGS

For a more complete understanding of the present invention and advantages thereof, reference is now made to the following description taken in conjunction with the accompanying drawings, in which like reference numbers indicate like features and wherein.

DETAILED DESCRIPTION OF THE DRAWINGS

The preferred embodiments of the present invention are illustrated in the FIGURES, like numerals being used to refer to like and corresponding parts of the various drawings.

Figure 1:
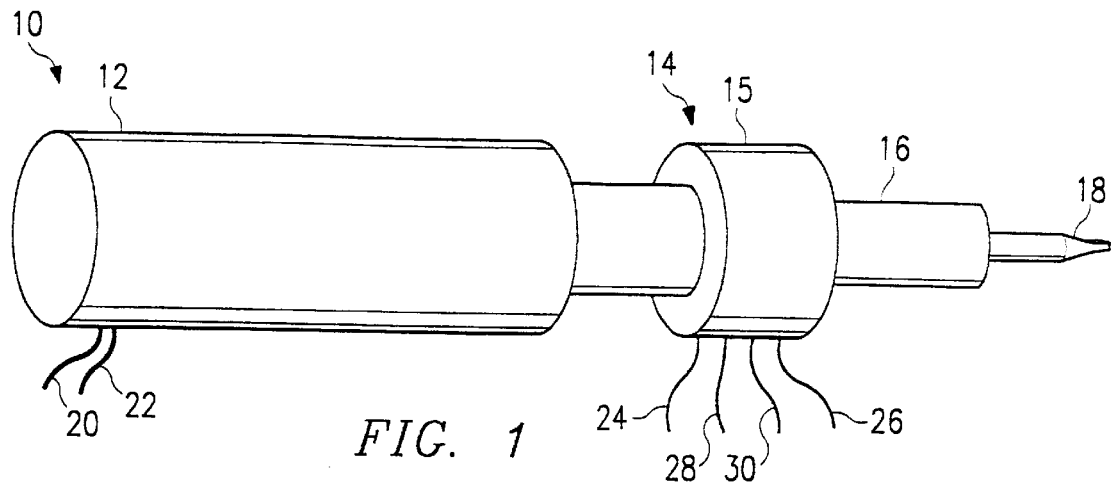
FIG. 1 is an exemplary threaded fastener driver embodying concepts of the present invention.

FIG. 1 is an exemplary threaded fastener driver 10 embodying concepts of the present invention. Threaded fastener driver 10 comprises electric motor 12, torque transducer assembly 14, shaft 16, and driver head 18. Electric motor 12 couples to shaft 16, and shaft 16 terminates with driver head 18. Torque transducer assembly 14 partially encircles shaft 16 and interacts with shaft 16. Threaded fastener driver 10 may be used to drive any mechanical fastener, including but not limited to screws, bolts, and nuts.

Electric motor 12 may comprise a direct current motor having leads 20 and 22. Leads 20 and 22 couple to a power source (not explicitly shown), such as a direct current power source. Electric motor 12 couples to shaft 16, such that when electric power is applied to leads 20 and 22, electric motor 12 causes shaft 16 to rotate. Electric motor 12 may couple to shaft 16 by welding, bolting, or other suitable means. Likewise, the rotor of electric motor 12 may be an extension from shaft 16.

Electric motor 12 may alternately comprise many suitable drivers, such as a servo motor, an AC motor, a pneumatic driver, or other suitable drivers. These alternate drivers may include a number of leads that are different from leads 20 and 22. Furthermore, electric motor 12 may include a gearbox to provide threaded fastener driver 10 with controllable ranges of speed and torque, and a resolver to provide the controller of motor 12 (not explicitly shown) with a commutation signal and signals for measuring the rotational angle of driver head 18. Electric motor 12 may be similar to ITD part no. 582071-7, available from ITD/INTOOL, 7007 Pinemont, Houston, Tex. 77040.

Torque transducer assembly 14 comprises torque transducer housing 15, excitation leads 24 and 26, and signal leads 28 and 30. Excitation leads 24 and 26 are used to apply a power signal to a bridge-type torque transducer contained within torque transducer housing 15, and signal leads 28 and 30 are used to sense the signal at the output of the bridge-type torque transducer. The connection of excitation leads 24 and 26 and signal leads 28 and 30 to torque transducer assembly 14 is described in greater detail in relation to FIG. 2. A circuit comprising a data processor and a data memory (not explicitly shown) are also contained within torque transducer housing 15. Torque transducer assembly 14 may be similar to ITD part no. 202877-7, available from ITD/INTOOL, 7007 Pinemont, Houston, Tex. 77040.

As previously noted, shaft 16 may comprise a single rotating component that comprises the rotor of electric motor 12 and torque transducer assembly 14. Alternately, shaft 16 may comprise several sections coupled via gear assemblies, bolted, welded, or coupled by other suitable means. Shaft 16 may include magnetic components that interact with electric motor 12 and torque transducer assembly 14. Shaft 16 also couples to driver head 18 by bolting, welding, or other suitable means.

Driver head 18 is a tool designed for use with threaded fasteners. For example, driver head 18 may fasten hexagonal head nuts, lug nuts, flat head screws, Phillips head screws, or other suitable threaded fasteners. Driver head 18 may be formed on the end of shaft 16. Alternately, driver head 18 may couple to shaft 16, such that driver head 18 can be removed from shaft 16 and replaced with other driver heads 18.

In operation, threaded fastener driver 10 is used to drive threaded fasteners for various applications. Electric power applied to leads 20 and 22 causes electric motor 12 to turn shaft 16 and driver head 18. Torque transducer assembly 14 measures the torque to shaft 16 and driver head 18, by measuring the signal at signal leads 28 and 30 that is derived by the change in resistance of the bridge of torque transducer assembly 14. The output at signal leads 28 and 30 is used to control the power applied to leads 20 and 22 electric motor 12. In this manner, the maximum torque applied to the threaded fastener being driven by threaded fastener driver 10 can be limited to a maximum torque level.

For example, torque transducer assembly 14 may generate an output such that the output signal at signal leads 28 and 30 should not exceed a predetermined set point of 10 millivolts when threaded fastener driver 10 is used to fasten a bolt. Driver head 18 is then placed on the bolt head, and power is applied to electric motor 12. The bolt is then driven until the torque transducer generates an output signal at signal leads 28 and 30 of 10 millivolts, at which point power to electric motor 12 is interrupted. This procedure makes up one cycle of threaded fastener driver 10, and the number of cycles stored in the memory storage device of torque transducer assembly 14 (not explicitly shown) is then incremented by one.

Torque transducer assembly 14 may be used with many suitable tools, such as ITD Model Nos. TT160-35 Series Nutrunners, TT160-235 Series Nutrunners, Series 35MTC7-R5 Nutrunners, 45MT4-R6 Series Nutrunners, or other ITD Nutrunners, available from ITD/INTOOL, 7007 Pinemont, Houston, Tex. 77040.

Figure 2:
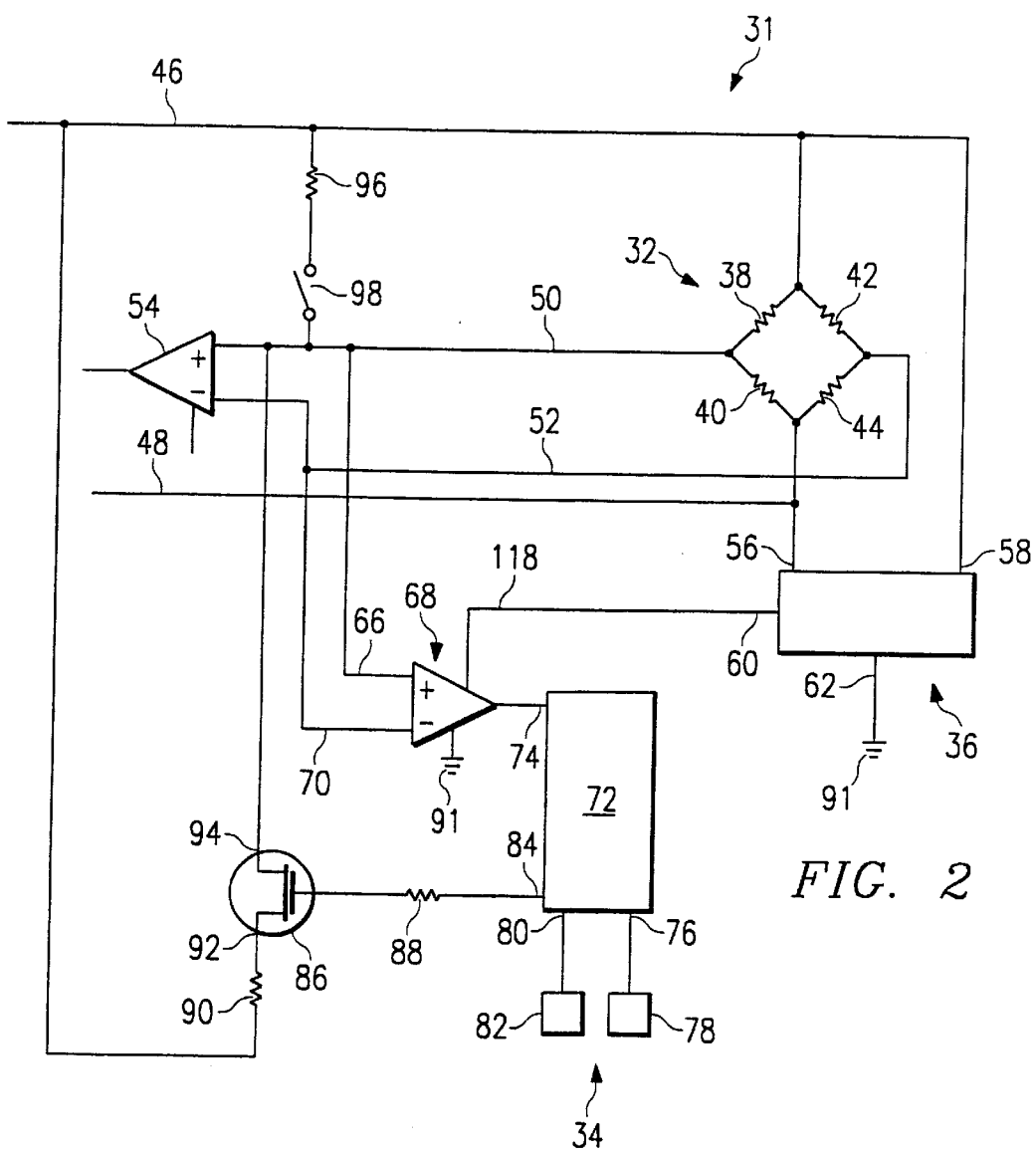
FIG. 2 is an exemplary electrical schematic diagram of a circuit with data processing and data memory capabilities for use with a torque transducer.

FIG. 2 is an exemplary electrical schematic diagram of a circuit 31 with data processing and data memory capabilities for use with a torque transducer, in accordance with teachings of the present invention. Circuit 31 includes torque transducer resistor bridge 32, data processor 34, and virtual ground regulator 36. Torque transducer resistor bridge 32, data processor 34 and virtual ground regulator 36 may be contained within torque transducer housing 15 shown in FIG. 1, or may alternately be placed in many suitable locations.

Torque transducer resistor bridge 32 includes resistors 38, 40, 42, and 44, which are resistive strain gauge elements that couple to shaft 16 via gears or other suitable means. The resistance values of resistors 38, 40, 42, and 44 change in magnitude when mechanical strain is applied to the material that forms the resistors. Bridge resistors 38 and 42 couple to excitation lead 46, and excitation lead 46 couples to excitation lead 24 shown in FIG. 1. Likewise, bridge resistors 40 and 44 couple to excitation lead 48, and excitation lead 48 couples to excitation lead 26 of FIG. 1. Bridge resistors 38 and 40 couple to signal lead 50, and bridge resistors 44 and 42 coupled to signal lead 52.

When no torque is being applied by shaft 16, resistors 38, 40, 42, and 44 are of equal value, such that the voltage differential generated across signal leads 50 and 52 by the applied excitation voltage at excitation leads 46 and 48 is approximately zero. When torque is applied to shaft 16 by electric motor 12, resistors 38, 40, 42, and 44 change resistance values, such that the voltage across signal leads 50 and 52 also changes. This change in voltage signal can be used to determine the torque that is being applied to shaft 16.

As shown in FIG. 2, signal leads 50 and 52 couple to instrument amp 54, but may alternately or also couple to signal leads 28 and 30, respectively, shown in FIG. 1. Excitation leads 46 and 48 also couple to virtual ground regulator 36 at inputs 56 and 58, respectively.

Virtual ground regulator 36 receives an excitation signal from excitation leads 46 and 48, and outputs a center reference voltage 118 from output 60 for use by instrument amp 68. Ground port 62 of virtual ground regulator 36 couples to reference common 91, which may be coupled to excitation lead 46.

Instrument amp 68 couples to signal lead 50 at positive input 66, signal lead 52 at negative input 70, to virtual ground regulator 36, and to reference common 91. The polarity markings as shown in FIG. 2 may be used when excitation lead 46 and signal lead 50 are carrying a positive DC polarity, and excitation lead 48 and signal lead 52 are carrying a negative DC polarity. The output of instrument amp 68 couples to processor 72 at signal input 74. Processor 72 also receives an input from clock 78 via clock input 76 and from data memory 82 at memory input 80.

Processor 72 is a data processing device that couples to instrument amplifier 68, data send field effect transistor (FET) 86, data memory 82, and clock 78. Processor 72 receives data from instrument amplifier 68 through signal input 74, and processes the data for storage on data memory 82. Processor 72 also receives digitally-encoded commands through instrument amplifier 68, and processes data in response to those commands and in accordance with software systems operating on memory devices contained within processor 72. Processor 72 also retrieves digitally-encoded data from data memory 82 and transmits that data over signal leads 50 and 52 by turning data send FET 86 on and off to digitally-encode the data retrieved from data memory 82.

Data memory 82 is an electrically erasable programmable read-only memory (EEPROM) that is operable to store data. Data memory 82 may alternately or also comprise other suitable memory storage devices, such as a random access memory (RAM). Processor 72 couples to data memory 82 in a manner that allows data to be written to and read from data memory 82.

Data send FET output 84 of processor 72 couples to data send FET 86 through resistor 88. Source 92 of data send FET 86 couples to excitation lead 46 through resistor 90. Drain 94 of data send FET 86 couples to signal lead 50.

In operation, an excitation signal is applied to excitation leads 46 and 48 of torque transducer assembly 14. Threaded fastener driver 10 is not applying a torque to a threaded fastener at this time, such that no mechanical strain is applied to the material that forms resistors 38, 40, 42, and 44. Therefore, resistors 38, 40, 42, and 44 are initially balanced, and the signal produced across signal leads 50 and 52 is approximately zero.

Before applying power to electric motor 12 and causing shaft 16 to rotate, switch 98 is closed, which causes load resistor 96 to placed across bridge resistor 38. The parallel combination of load resistor 96 and bridge resistor 38 causes resistor bridge 32 to become unbalanced, which results in a predetermined net voltage across signal leads 50 and 52. If the measured voltage across signal leads 50 and 52 is not equal to the predetermined net voltage, an error signal is generated and power to electric motor 12 may be disabled.

When threaded fastener driver 10 applies a torque to a threaded fastener via shaft 16 and driver head 18, the resistance of one or more of bridge resistors 38, 40, 42, or 44 changes in proportion to the torque applied. This change in resistance unbalances resistor bridge 32, which creates a voltage across signal leads 50 and 52. This voltage signal is applied to positive input 66 and negative input 70 of instrument amp 68, which amplifies the voltage and applies it to signal input 74 of processor 72.

Processor 72 is operable to perform data processing functions on the voltage signal received at signal input 74, such as determining whether the signal is a cycle of threaded fastener driver 10, a calibration cycle, or data that is being transmitted to processor 72. One method for processing data received at processor 72 is further described in regards to FIG. 4, and involves measuring the rise time of the signal. Alternately, processor 72 may perform other data processing functions that determine whether the signal is a cycle of threaded fastener 10, such as measuring the direction of current on excitation leads 46 and 48.

Processor 72 receives a clock signal from clock 78 via clock input 76. This clock signal provides a timing reference to processor 72. Likewise, processor 72 is operable to transfer data to data memory 82, and to receive data stored on data memory 82.

One skilled in the art will recognize that various substitutions and modifications can be made to the electrical schematic diagram of circuit 31 without departing from the spirit or the scope of the present invention. For example, if a ground lead is available, virtual ground regulator 36 may be omitted. In addition, bridge circuit 32 may be replaced by other suitable transducers, such as pressure transducers or strain transducers.

Figure 3:
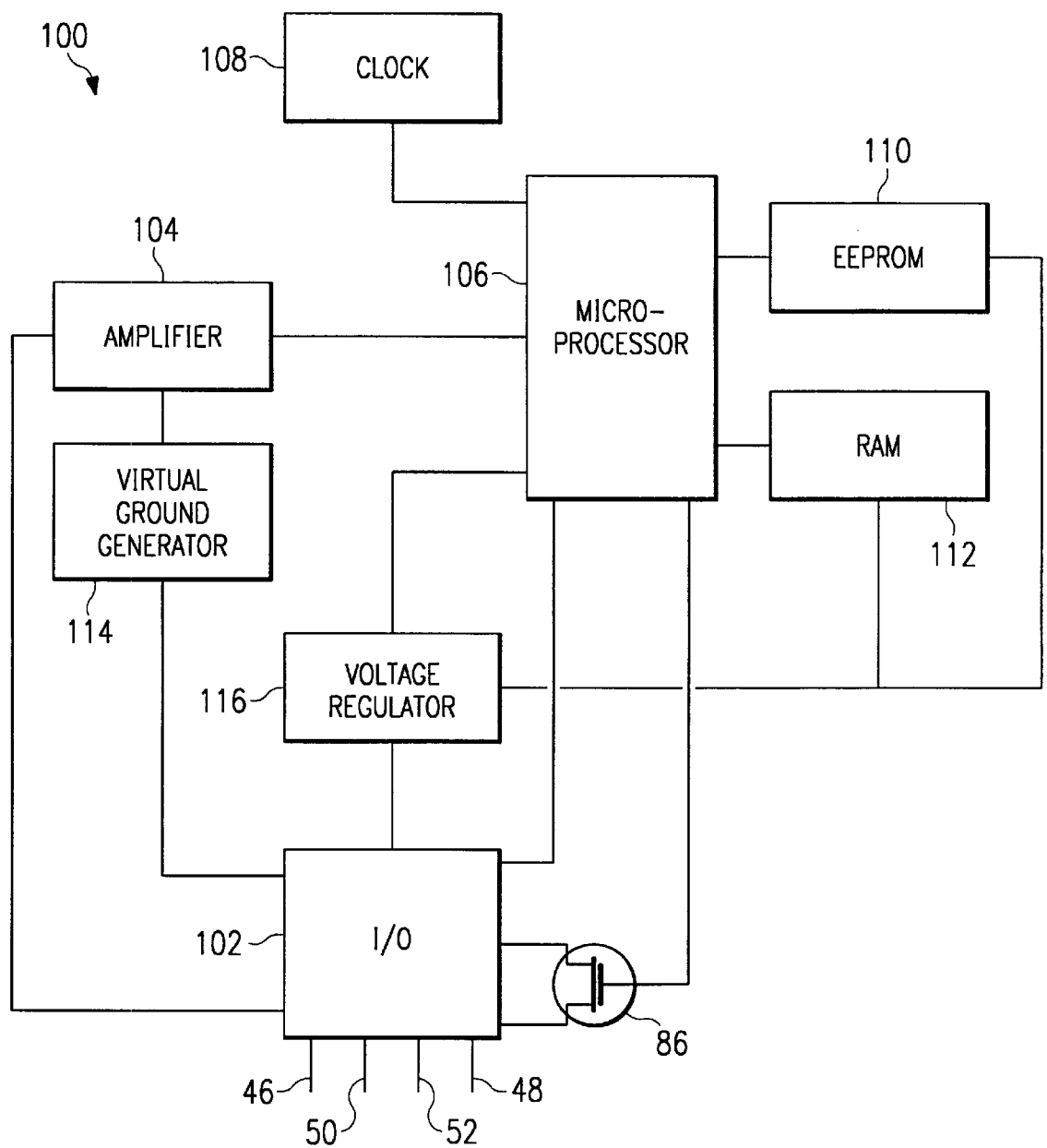
FIG. 3 is a block diagram of a data processing and data memory circuit for use with a torque transducer.

FIG. 3 is a block diagram of a data processing and data memory circuit 100 similar to circuit 31 of FIG. 2 for use in conjunction with a torque transducer. Data processing and data memory circuit 100 includes input circuitry 102 (I/O), amplifier 104, microprocessor 106, clock circuit 108, EEPROM 110, random access memory (RAM) 112, virtual ground generator 114, data send FET 86, and voltage regulator 116. Data processing and data memory circuit 100 may comprise discrete components or a single monolithic silicon device, and may be installed inside torque transducer housing 15, the housing of motor 12, external to threaded fastener driver 10, or in other suitable locations.

Data processing and data memory circuit 100 may be installed in parallel with a torque transducer, such that the functionality of the torque transducer remains the same. Data processing and data memory circuit 100 may remain transparent to a tool controller that is not designed to interface with the circuit, but will nonetheless continue to count and store torque tool cycles.

Input circuitry 102 couples to excitation leads 46 and 48 and signal leads 50 and 52, and also couples to amplifier 104, virtual ground generator 114, voltage regulator 116, microprocessor 106, and data send FET 86. Input circuitry 102 is operable to protect data processor and data memory circuit 100 from inadvertent connection with voltages of an improper polarity. For example, input circuitry 102 may include a diode bridge that protects the electronic components of data processing and data memory circuit 100 from being damaged if the polarity of the voltage signal applied to excitation leads 46 and 48 and signal leads 50 and 52 is reversed.

Input circuitry 102 is further operable to transmit the signal received at signal leads 50 and 52 to amplifier 104, and to receive encoded data on signal lead 50 from data send FET 86. Input circuitry 102 is also operable to transmit the signal received at excitation leads 46 and 48 to amplifier 104, virtual ground generator 114, voltage regulator 116, and microprocessor 106.

Amplifier 104 receives a signal from input circuitry 102 that is derived from signal leads 50 and 52, and amplifies the signal. Amplifier 104 also couples to microprocessor 106 and virtual ground generator 114. Amplifier 104 transmits the amplified signal received from signal leads 50 and 52 via input circuitry 102 to microprocessor 106. Amplifier 104 corresponds to instrument amp 68 in FIG. 2.

Microprocessor 106 is operable to receive the signal from amplifier 104 and to process data encoded in the signal. For example, microprocessor 106 can determine the number of torque cycles that a torque tool undergoes when data processing and data memory circuit 100 is installed in parallel with a torque transducer 14, such as is shown in FIG. 3. Microprocessor 106 is further operable to store and retrieve tool identification and stored cycle count information on a first memory device such as EEPROM 110 and on a second memory device such as RAM 112 that is transmitted to data processing and data memory circuit 100 through signal leads 50 and 52. Microprocessor 106 couples to amplifier 104, input circuitry 102, clock circuit 108, EEPROM 110, RAM 112, virtual ground generator 114, voltage regulator 116, and data send FET 86.

Clock circuit 108 is a standard periodic signal generator that provides a timing signal to microprocessor 106. For example, clock circuit 108 may include an electrically-stimulated oscillating crystal, wherein the timing signal is based on the frequency of oscillation of the crystal. Clock circuit 108 couples to microprocessor 106.

EEPROM 110 is preferably an electrically erasable programmable read-only memory that receives data and control commands from microprocessor 106. Upon receipt of appropriate signals from microprocessor 106, EEPROM 110 is functional to store digitally-encoded data. Likewise, EEPROM 110 is further operable to allow the digitally-encoded data to be read upon receipt of appropriate signals from microprocessor 106. EEPROM 110 is preferably a non-volatile data memory that is operable to store data indefinitely after power to EEPROM 110 has been interrupted. EEPROM 110 couples to microprocessor 106 and voltage regulator 116.

RAM 112 is a random access memory that stores digitally-encoded data received from microprocessor 106. RAM 112 is preferably a volatile digital data memory, and cannot store memory after power to RAM 112 has been interrupted. The data stored on RAM 112 may be read by microprocessor 106. RAM 112 couples to microprocessor 106 and voltage regulator 116.

Virtual ground generator 114 determines a virtual ground based upon the voltage signal of excitation leads 46 and 48. Virtual ground generator 114 takes the place of an actual ground lead, which is advantageous in the present invention because of the absence of additional cabling for such a ground lead. Virtual ground generator 114 couples to amplifier 104 and input circuitry 102. Virtual ground generator 114 receives an excitation signal from excitation leads 46 and 48 via input circuitry 102, and outputs a virtual ground signal to amplifier 104. Virtual ground generator 114 corresponds to virtual ground regulator 36 in FIG. 2.

Voltage regulator 116 receives an excitation signal from excitation leads 46 and 48 and outputs a five-volt signal to microprocessor 106, EEPROM 110, and RAM 112. Voltage regulator 116 couples to microprocessor 106, input circuitry 102, EEPROM 110, and RAM 112.

In operation, data processing and data memory circuit 100 is operable to receive a signal from signal leads 50 and 52 and to process the signal. For example, data processing and data memory circuit 100 may process the signal to determine the number of torque tool cycles that have been generated, and may store this number of cycles on RAM 112 or EEPROM 110. Furthermore, microprocessor 106 of data processing and data memory circuit 100 is operable to determine whether a calibration signal has been received, and to digitally-encode data on signal lead 50 using data send FET 86.

One skilled in the art will recognize that various substitutions and modifications can be made to data processing and data memory circuit 100 without departing from the spirit or the scope of the present invention. For example, if a ground lead to data processing and data memory circuit 100 is available, virtual ground generator 114 may be omitted. In addition, EEPROM 110 and RAM 112 may be replaced by other suitable memory devices.

Figure 4A:
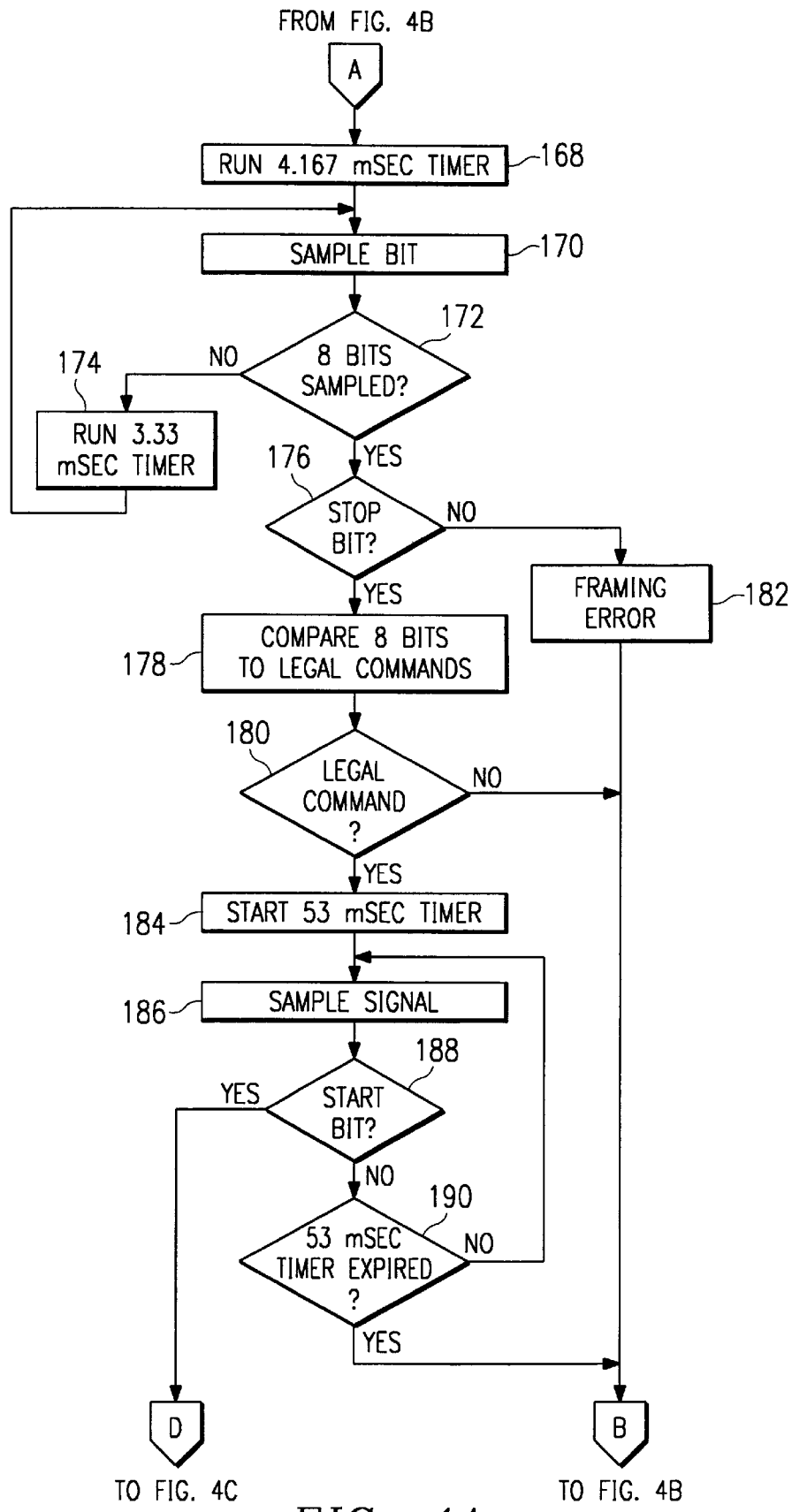
FIGS. 4A through 4C are a flow chart of a method for monitoring tool cycles in accordance with teachings of the present invention.
Figure 4B:
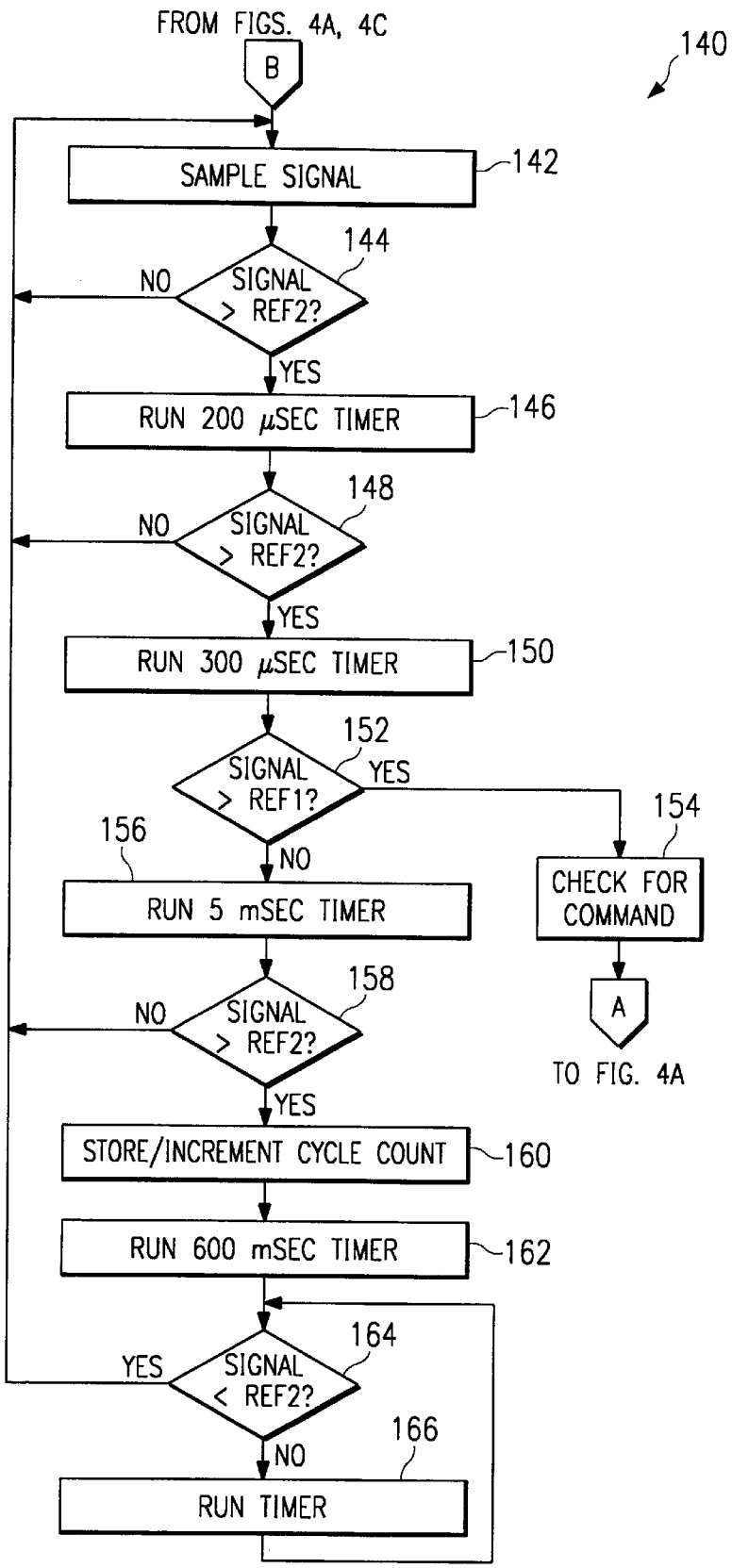
Figure 4C:
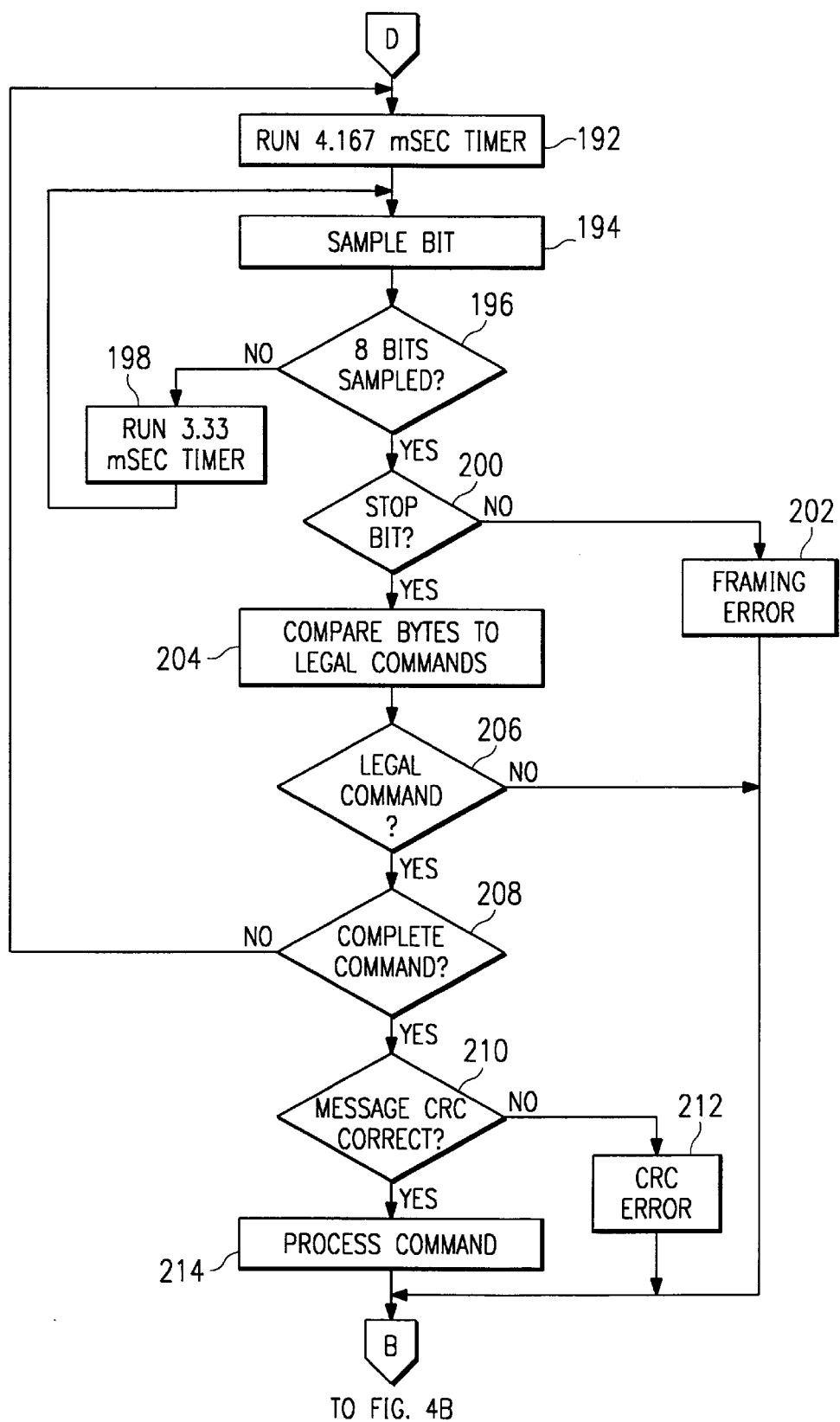

FIGS. 4A through 4C are a flow chart of method 140 for monitoring tool cycles, in accordance with teachings of the present invention. Method 140 may be used in conjunction with the apparatus shown in and described in relation to FIGS. 1 through 3, or with other suitable devices in accordance with teachings of the present invention. At step 142, the signal received over signal leads 50 and 52 is sampled by data processing and data memory circuit 100 of torque transducer assembly 14. Sampling occurs when the signal at signal leads 50 and 52 is amplified by amplifier 104 of FIG. 3. Amplifier 104 inputs the amplified signal to microprocessor 106, which reads the signal as either a logical one or a logical zero, characteristic of digitally encoded data.

At step 144, the signal received at step 142 is compared by microprocessor 106 to a predetermined second reference signal magnitude stored on EEPROM 110. If the signal received over signal leads 50 and 52 at step 142 is greater than this predetermined second reference signal magnitude, the method proceeds to step 146. Otherwise, the method returns to step 142, where the signal at signal leads 50 and 52 is sampled again.

At step 146, a 200-microsecond timer is activated. For example, microprocessor 106 may include operating instructions that cause it to count a number of clock cycles that elapse during a 200-microsecond interval. After the 200-microsecond timer has timed-out, the method proceeds to step 148. At step 148, the signal from signal leads 50 and 52 is again sampled, and the sampled voltage signal magnitude is compared with the predetermined second reference signal magnitude. If the signal sampled from signal leads 50 and 52 at step 148 is greater than the predetermined second reference signal magnitude, the method proceeds to step 150. Otherwise, the method returns to step 142.

At step 150, a 300-microsecond timer is run, such as in a manner similar to that of the 200-microsecond timer previously described. After the 300-microsecond timer has timed out, the method proceeds to step 152. At step 152, the voltage signal from signal leads 50 and 52 is again sampled. If the magnitude of the voltage signal from signal leads 50 and 52 sampled at step 152 is greater than a predetermined first reference signal magnitude, then a tool cycle is not occurring, because the rise time of the voltage signal is too rapid. Instead, the voltage signal sampled from signal leads 50 and 52 may be encoded digital data. The method proceeds to step 154, where the presence of encoded digital data on signal leads 50 and 52 is determined.

If the signal received at signal leads 50 and 52 is not digitally encoded data, the method proceeds to step 156 to determine whether the signal received at signal leads 50 and 52 indicates that threaded fastener driver 10 is being cycled. At step 156, a five-millisecond timer is run. After the five-millisecond timer has timed out, the method proceeds to step 158. At step 158, the signal received over signal leads 50 and 52 is sampled again. If the signal sampled at step 158 is greater than the predetermined second reference signal magnitude, the signal is indicative that threaded fastener driver 10 is undergoing a torque cycle, and the method proceeds to step 160. Otherwise, the signal may be a random noise signal or other spurious signal, and the method returns to step 142.

If the method has proceeded to step 160, the signal received at signal leads 50 and 52 has exceeded the predetermined second reference signal magnitude for greater than five milliseconds, but has not reached the predetermined first reference signal magnitude in less than 500 microseconds. This rise time shows that the signal received is indicative of a torque cycle of threaded fastener driver 10. The stored cycle count on RAM 112 of FIG. 3 is incremented by one by microprocessor 106 of FIG. 3. This stored cycle count is then stored on RAM 112 of FIG. 3.

At step 162, a 600-millisecond timer is run, to allow the signal being generated by torque transducer assembly 14 to fall below the predetermined second reference signal magnitude. After the 600-millisecond timer has timed out, the method proceeds to step 164. At step 164, the signal received at signal leads 50 and 52 is sampled. If the sampled signal is greater than the predetermined second reference signal magnitude, then the signal generated by torque transducer assembly 14 during the measured cycle of threaded fastener driver 10 has not yet abated, and the method proceeds to step 166. At step 166, a timer is activated for a predetermined period, such as 5 milliseconds, to allow the signal generated by torque transducer assembly 14 to abate. After the timer times out, the method returns to step 164.

If the signal sampled at signal leads 50 and 52 at step 164 is less than the predetermined second reference signal magnitude, the signal generated by torque transducer assembly 14 has abated. The method proceeds to step 142, where the signal at signal leads 50 and 52 is monitored to detect the beginning of another threaded fastener driver 10 cycle, or the transmission of digitally-encoded data.

Returning to step 152, if the signal sampled at signal leads 50 and 52 at step 152 is greater than the predetermined first reference signal magnitude, this is indicative that a digitally-encoded command is being received via signal leads 50 and 52 for processing by microprocessor 106 of FIG. 3. The method proceeds to step 154, which checks for the presence of a command being transmitted over signal leads 50 and 52. Step 154 proceeds to step 168, where a 4.167 millisecond timer is run.

If encoded digital data is being transmitted, the data is being transmitted at a predetermined digital data transmission rate. For example, if the data is being transmitted at a digital data transmission rate of 300 baud, one digital bit of data will be transmitted every $\frac{1}{300}$ or 3.33 milliseconds. In this example, the bit time is therefore 3.33 milliseconds. The digital data baud rate will also determine the sampling frequency, as digitally encoded data should be sampled near the center of the bit. Thus, for digitally-encoded data being transmitted at a rate of 300 baud, data should be sampled at 1.5 bit times or 5 milliseconds after the start bit. For the method shown in FIG. 4 as applied to the present example, 0.5 milliseconds has already elapsed, plus some additional processing time. Therefore, the first data bit should be sampled at approximately 4.167 milliseconds after the method reaches step 152.

After the timer has timed out, the signal received at signal leads 50 and 52 is sampled at step 170. At step 172, the number of bits that have been sampled is checked. If eight bits have been sampled, the method proceeds to step 176. If less than 8 bits have been sampled, the method proceeds to step 174.

At step 174, a 3.33 millisecond timer is run, which is the length of time that must elapse until the center of the next bit time is reached in the present example. After the timer has timed out, the method returns to step 170 so that the next bit of digitally encoded data may be measured.

If eight bits have been sampled at step 172, one byte of digitally encoded data has been received, and the method proceeds to step 176 to check for the presence of a stop bit. At step 176, the signal received at signal leads 50 and 52 is sampled. If the sampled signal is equivalent to a predetermined stop bit, such as a logical 0 or a logical 1, then the method proceeds to step 178. If a stop bit has not been detected at step 176, then a framing error has occurred, such that the first bit detected by torque transducer assembly 14 was not the first bit of the data byte being transmitted. The method proceeds to step 182, where a framing error message is generated. The method then returns to step 142.

If a stop bit has been detected at step 176, then one byte of data may have been correctly received, and the method proceeds to step 178. Nevertheless, there is a fifty percent chance that a subsequent data bit may be the same as the predetermined stop bit. Therefore, additional methods described below are used to verify data quality. The first method begins at step 178, where the eight bits received over signal leads 50 and 52 are compared with the list of legal commands stored on RAM 112. These eight bits are the first byte of data, which represents the first character of a command. At step 180, this first character is tested to determine whether any legal commands begin with this first character. If no legal commands begin with this first character, then an error has occurred in command transmission or data reception, and the method returns to step 142. If one or more commands are defined by the first character, the method proceeds to step 184.

At step 184, a 53-millisecond timer is started, and the method then proceeds to step 186 as the 53 millisecond timer runs. At step 186, the signal received over signal leads 50 and 52 is sampled. At step 188, the signal sampled at step 186 is tested to determine if it is a start bit. If the signal is a start bit, the method proceeds to step 192. Otherwise, the method proceeds to step 190.

At step 190, the 53-millisecond timer is checked for timeout. If the 53-millisecond timer has timed out, then 53 milliseconds have elapsed without the occurrence of a start bit for another byte, and receive timeout has occurred. The method then returns to step 142 to await the transmission of data or the occurrence of a torque cycle of threaded fastener driver 10. If the 53-millisecond timer has not timed out, then receive timeout has not occurred and the method returns to step 186.

If a start bit is detected at step 188, a 4.167 millisecond timer is run at step 192 to allow the presence of a first data bit to be tested for. After the 4.167 millisecond timer has timed out, the method proceeds to step 194. At step 194, the signal received at signal leads 50 and 52 is sampled. If all eight bits of the next byte have been sampled at step 196, the method proceeds to step 200. Otherwise, the method proceeds to step 198. At step 198, a 3.33 millisecond timer is run to allow the next bit to be tested for. After the 3.33 millisecond timer has timed out, the method returns to step 194.

At step 200, the signal received at signal leads 50 and 52 is sampled to test for the occurrence of a stop bit. If the sampled signal is a stop bit, the method proceeds to step 204. If the sample signal is not a stop bit, then a framing error has occurred and the method proceeds to step 202. At step 202, a framing error is declared, and the method returns to step 142.

At step 204, the eight bits of the present data byte and the previously-received bytes are compared with the list of legal commands stored on RAM 112 by microprocessor 106 of FIG. 3. If the received bytes are found to correlate to a legal command at step 206, the method proceeds to step 208. Otherwise, a data generation or transmission error has occurred and the method returns to step 142. At step 208, it is determined whether a complete command has been received. If a complete command has been received, the method proceeds to step 210. Otherwise, the method returns to step 192 for completion of transmission.

At step 210, a complete command has been received. The method then determines if the control record check bit (CRC) of the received message is correct. The CRC is a numerical value that is derived from the data received from the message, and is used to verify the quality of data received from a transmission. If the transmitted CRC equals the CRC determined from the received data, the CRC is said to be positive, and the method proceeds to step 214. If the transmitted CRC does not equal the CRC determined from the received data, the CRC is said to be negative. A negative CRC indicates that an error has occurred in data transmission, and the method proceeds to step 212 where a CRC error is declared. The method then returns to step 142 to await transmission of data or the occurrence of a torque cycle of threaded fastener driver 10.

If the transmitted CRC value is determined to be equal to the CRC value derived from the data at step 210, the method proceeds to step 214, where the command is processed by microprocessor 106 of FIG. 3. For example, a command may cause microprocessor 106 to transmit data stored in RAM 112 or EEPROM 110 over signal leads 50 and 52. After the command has been processed by microprocessor 106 at step 214, the method returns to step 142 to await further transmission of data or the occurrence of a torque cycle of threaded fastener driver 10.

In operation, torque transducer assembly 14 is initially calibrated by dead weight testing. During calibration testing, calibration data, tool speed data, tool torque capability data, and other suitable data is stored on and retrieved from EEPROM 110. Storing this data on and retrieving this data from EEPROM 110 of torque transducer assembly 14 alleviates tool tracking and handling normally associated with tool calibration, because the data may be easily read when the tool is connected to the calibration equipment.

After calibration of the tool is performed, digitally encoded data is transmitted to microprocessor 106 of torque transducer assembly 14 over signal leads 50 and 52. This data may include operating instructions for microprocessor 106 that cause microprocessor 106 to store digitally encoded data transmitted over signal leads 50 and 52 on EEPROM 110 or RAM 112, retrieve digitally encoded data from EEPROM 110 or RAM 112, or process other suitable commands. After calibration procedures have been completed, any data stored on RAM 112 that must be saved for future use must be stored on EEPROM 110, prior to interruption of power to torque transducer assembly 14.

After the tool is returned from the workshop to the field for use, torque transducer assembly 14 monitors the number of torque cycles that the tool undergoes. If the signal received over signal leads 50 and 52 exceeds the predetermined second reference signal magnitude, microprocessor 106 continues to sample the signal to determine if the signal has a waveform that identifies it as a torque cycle. If the signal exceeds the predetermined first reference signal magnitude within a certain period, then the signal is rising too quickly and cannot be generated by a torque cycle. Alternately, if the signal rises at an appropriate rate and stays above the predetermined second reference signal magnitude but below the predetermined first reference signal magnitude for a sufficient period, then the signal has a waveform that identifies it as a torque cycle of threaded fastener driver 10. Microprocessor 106 then increments the number of torque cycles stored on RAM 112.

As previously mentioned, any data stored on RAM 112 must be transferred to EEPROM 110 prior to interruption of power, or the data will be lost. Therefore, the previous stored cycle count of the torque cycles measured by torque transducer assembly 14 must be retrieved from EEPROM 110 after power is initially applied to torque transducer assembly 14, and stored on RAM 112. The stored cycle count may then be updated and stored on RAM 112 while threaded fastener driver 10 is in use. Prior to interruption of power, the torque cycle count stored on RAM 112 may then be stored on EEPROM 110, thus reducing the number of times EEPROM 110 must be written to and extending the life of EEPROM 110.

One skilled in the art will recognize that the steps of the present method may be altered or deleted without departing from the spirit or scope of the present invention. For example, any steps that include the execution of a timer for a period may be altered to run the timer for any suitable period. Likewise, the order of sampling, testing sampled signal, processing commands, storing or retrieving data, or other similar functions may be altered without departing from the spirit or scope of the present invention.

Although the present invention has been described in detail, it should be understood that various changes, substitutions and alterations can be made hereto without departing from the spirit and scope of the invention as defined by the appended claims.

What is claimed is:

1. A method for processing data with a circuit for use with a torque transducer installed on a tool, the method comprising the steps of:

sampling a signal from a torque transducer;

determining from the signal whether a torque cycle of the tool or another cycle has occurred by sampling a magnitude of the signal over time; and incrementing a stored cycle count on a data memory device of the circuit if the torque cycle has occurred.

2. The method of claim 1 further comprising the step of receiving encoded digital data with a data processor of the circuit.

3. The method of claim 1 further comprising the step of transmitting encoded digital data with a data processor of the circuit.

4. The method of claim 1 further comprising the step of storing tool data on the data memory device.

5. The method of claim 1 further comprising the step of reading tool data from the data memory device.

6. The method of claim 1 further comprising the steps of:

reading cycle count data from the data memory device prior to using the tool;

storing the cycle count data on the data memory device;

incrementing the cycle count stored on the data memory device by one for each tool cycle;

reading the cycle count stored on the data memory device prior to shutting off power to the tool; and storing the cycle count on the data memory device prior to shutting off power to the tool.

7. The method of claim 1 wherein the incrementing step comprises the steps of:

comparing the sampled signal to a first reference voltage;

checking the signal for encoded digital data if the sampled signal exceeds the first reference voltage;

comparing the sampled signal to a second reference voltage; and incrementing the stored cycle count on the data memory device of the circuit if the signal remains above the second reference voltage for a predetermined period of time.

8. The method of claim 2 wherein the step of receiving encoded digital data comprises the steps of:

receiving one or more bits of digitally encoded data;

forming a byte from one or more bits of digitally encoded data;

comparing the first byte received to a first byte of each command in a list of commands stored in the data memory device; and receiving additional bytes if the first byte received matches the first byte of at least one command in the list of commands.

9. The method of claim 8 further comprising the steps of:

performing a control record check of a command received at the data processor; and performing the command with the data processor if the control record check is positive.

10. The method of step 8 wherein the receiving one or more bits step further comprises:

comparing the sampled signal to a first reference voltage; and reading one or more subsequent bits of encoded digital data if the sampled signal exceeds the first reference voltage.

11. A method for processing torque transducer data comprising the steps of:

sampling a signal from a torque transducer;

comparing the sampled signal to a first reference voltage;

checking the signal for encoded digital data if the sampled signal exceeds the first reference voltage;

comparing the sampled signal to a second reference voltage;

incrementing the stored cycle count on the data memory device at the torque transducer if the signal remains above the second reference voltage for a predetermined period of time receiving one or more bits of digitally encoded data;

forming a byte from one or more bits of digitally encoded data;

comparing the first byte received to a first byte of each command in a list of commands stored in the data memory device; and receiving additional bytes if the first byte received matches the first byte of at least one command in the list of commands.

12. The method of claim 11 further comprising the step of transmitting encoded digital data with a data processor at the torque transducer.

13. The method of claim 11 further comprising the step of storing tool data on the data memory device.

14. The method of claim 11 further comprising the step of reading tool data from the data memory device.

15. The method of claim 11 further comprising the steps of:

performing a control record check of a command received at the data processor; and performing the command with the data processor if the control record check is positive.

16. The method of step 11 wherein the receiving one or more bits step further comprises:

comparing the sampled signal to a first reference voltage; and reading one or more subsequent bits of encoded digital data if the sampled signal exceeds the first reference voltage.

17. A method for processing data with a circuit for use with a torque transducer installed on a tool, the method comprising the steps of:

sampling a signal from at least one lead of a torque transducer; and evaluating the signal to discern a digital data signal from an analog torque signal, the digital data signal being discerned from the analog torque signal by sampling a magnitude of the signal from the lead of the torque transducer over time.

18. The method of claim 17, further comprising discerning from the analog torque signal whether a torque cycle of the tool or a calibration cycle of a tool has occurred.

19. The method of claim 17, further comprising storing in a memory the digital data.

20. The method of claim 19, wherein the digital data includes one of status data for a tool used with the torque transducer, calibration data for the tool used with the torque transducer, and tool identification data for the tool used with the torque transducer.

21. The method of claim 17, further comprising counting a number of torque cycles of a tool that have occurred.

22. The method of claim 21, further comprising storing in a memory the number of torque cycles of the tool that have occurred.

23. The method of claim 22, further comprising reading from the memory the number of torque cycles of the tool that have occurred.

24. The method of claim 23, further comprising transmitting the read number of torque cycles on the at least one lead.

25. A method for processing data with a circuit for use with a torque transducer installed on a tool having a motor, the method comprising the steps of:

sampling an analog signal on at least one lead of a torque transducer before and after the motor of the tool is caused to operate; and sampling a magnitude of the signal over time to determine from the signal whether a torque cycle of the tool or a calibration cycle of the tool has occurred.

26. The method of claim 25, further comprising sampling a digital signal from the at least one lead of the torque transducer, and sampling the magnitude of the digital signal over time to discern the digital signal from other signals.

27. The method of claim 25, wherein the sampling of the magnitude of the signal over time includes comparing the signal to a reference voltage and determining whether the signal remains above the reference voltage for a period of time.

28. The method of claim 1, wherein the stored cycle count is incremented by one for each torque cycle, and the stored cycle count represents a plurality of torque cycles that have occurred.

29. The method of claim 1, wherein the another cycle is a calibration cycle of the tool.

30. The method of claim 1, further comprising receiving digital data along at least one lead of said torque transducer, and transmitting digital data along said lead.

31. A method for processing data with a circuit for use with a torque transducer installed on a tool, the method comprising the step of evaluating a signal from a lead of a torque transducer to discern an analog torque cycle signal from another signal by sampling a magnitude of the signal over time, the another signal including at least one of a digital data signal and an analog calibration cycle signal.

32. The method of claim 31, wherein the sampling of the magnitude of the signal over time includes comparing the signal to a reference voltage and determining whether the signal remains above the reference voltage for a period of time.

33. The method of claim 32, further comprising incrementing a stored cycle count on a data memory device each time a torque cycle of the tool has occurred.

34. The method of claim 33, further comprising storing in a memory the digital data.

* * * * *